United States Patent [19]

Dent

[11] Patent Number: 5,377,183
[45] Date of Patent: Dec. 27, 1994

[54] CALLING CHANNEL IN CDMA COMMUNICATIONS SYSTEM

[75] Inventor: Paul W. Dent, Stehag, Sweden

[73] Assignee: Ericsson-GE Mobile Communications Inc., Research Triangle Park, N.C.

[21] Appl. No.: 226,470

[22] Filed: Apr. 11, 1994

Related U.S. Application Data

[63] Continuation of Ser. No. 868,335, Apr. 13, 1992, abandoned.

[51] Int. Cl.$^5$ .................... H04B 7/216; H04B 7/26
[52] U.S. Cl. .................... 370/18; 370/110.1; 375/1; 455/56.1
[58] Field of Search .................... 370/18, 19, 21, 22, 110.1; 375/1; 379/59, 60, 63; 380/28, 33, 34, 49; 455/33.1, 33.2, 33.4, 38.3, 53.1, 54.1, 56.1

[56] References Cited

U.S. PATENT DOCUMENTS

| | | | |
|---|---|---|---|
| 4,134,071 | 1/1979 | Ohnsorge | 375/1 |
| 4,470,138 | 9/1984 | Gutleber | 370/18 |
| 4,644,560 | 2/1987 | Torre et al. | 375/1 |
| 4,697,260 | 9/1987 | Grauel et al. | 370/18 |
| 4,839,844 | 6/1989 | Watari | 364/727 |
| 4,901,307 | 2/1990 | Gilhousen et al. | 370/18 |
| 4,930,140 | 5/1990 | Cripps et al. | 375/1 |
| 4,961,073 | 10/1990 | Drapac et al. | 455/38.3 |
| 4,984,247 | 1/1991 | Kaufmann et al. | 375/1 |
| 5,022,049 | 6/1991 | Abrahamson et al. | 375/1 |
| 5,048,059 | 9/1991 | Dent | 375/1 |
| 5,056,109 | 10/1991 | Gilhousen et al. | 455/33.1 |
| 5,091,942 | 2/1992 | Dent | 379/59 |
| 5,101,501 | 3/1992 | Gilhousen et al. | 455/33.2 |
| 5,103,459 | 4/1992 | Gilhousen et al. | 455/33.1 |
| 5,109,390 | 4/1992 | Gilhousen et al. | 375/1 |
| 5,127,021 | 6/1992 | Schreiber | 375/1 |
| 5,151,919 | 9/1992 | Dent | 375/1 |
| 5,164,958 | 11/1992 | Omura | 375/1 |
| 5,179,571 | 1/1993 | Schilling | 375/1 |

OTHER PUBLICATIONS

R. Kohno et al., "Adaptive Cancellation of Interference in Direct-Sequence Spread-Spectrum Multiple Access Systems", Proceedings IEEE Global Telecommunications Conference, vol. 1, pp. 630–634 (Nov. 15, 1987).

T. Masamura, "Spread Spectrum Multiple Access System with Intrasystem Interference Cancellation", Trans. of the Institute of Electronics and Communication Engineers of Japan, Section E71, No. 3, pp. 224–231 (Mar. 1, 1988).

M. K. Varanasi et al., "An Iterative Detector for Asynchonous Spread-Spectrum Multiple-Access Systems", Proceeding IEEE Global Telecommunications Conference, vol. 1, pp. 556–560 (Nov. 28, 1988).

Tzannes, N. S., *Communication and Radar Systems*, New Jersey: Prentice-Hall, Inc., 1985, pp. 227–239.

Stremler, F. G., *Introduction to Communication Systems*, Massachusetts Addison-Wesley Publishing Co., 1982, pp. 406–418.

"Introduction to Spread-Spectrum Antimultipath Techniques and Their Application to Urban Digital

(List continued on next page.)

*Primary Examiner*—Douglas W. Olms
*Assistant Examiner*—Hassan Kizou
*Attorney, Agent, or Firm*—Burns, Doane, Swecker & Mathis

[57] ABSTRACT

A Code Division Multiple Access (CDMA) communication system which contains a calling channel which is used to inform silent mobiles that they are being called. In the system, the calling channel is chosen to be the strongest overlapping signal so that it reaches mobiles which are located on the cells extreme boundaries. The interference other signals experience because they overlap with the calling channel may be avoided by having the mobiles first demodulate the calling channel signal and then subtract it out before demodulating their own signal.

28 Claims, 7 Drawing Sheets

OTHER PUBLICATIONS

Radio", G. Turin, Proceedings of the IEEE, vol. 68, No. 3, Mar. 1980.

"A Communication Technique for Multipath Channels", R. Price et al., Proceedings of the IRE, Mar. 1958, pp. 555–570.

"Fading Channel Communications", P. Monsen, IEEE Communications Magazine, Jan. 1980, pp. 16–25.

Proakis, J. G., *Digital Communications*, New York: McGraw-Hill 1989, pp. 728–739.

"Origins of Spread-Spectrum Communications", Scholtz, IEEE Transactions on Communications, vol. COM-30, No. 5, May 1982, pp. 18–21.

"A Class of Low-Rate Nonlinear Binary Codes", A Kerdock, Information and Control, vol. 20, pp. 182–187 (1972).

MacWilliams, F., *The Theory of Error-Correcting Codes, Part I and II*, New York: North-Holland, 1988, pp. 93–124, 451–465.

"Natural, Dyadic, and Sequency Order Algorithms and Processors for the Walsh-Hadamard Transform", Y. Geadah, IEEE Trans. on Computers, vol. C-26, No. 5, May 1977.

"Very Low Rate Convolutional Codes for Maximum Theoretical Performance of Spread-Spectrum Multiple-Access Channels" A Viterbi, IEEE Journal on Selected Areas in Communications, vol. 8, No. 4, May 1990.

"On the Capacity of a Cellular CDMA System", K. Gilhousen, IEEE Trans. on Vehicular Technology, vol. 40, No. 2, May 1991.

CALLING CHANNEL IN CDMA COMMUNICATIONS SYSTEM

This application is a continuation of application Ser. No. 07/868,355, filed Apr. 13, 1992, now abandoned.

FIELD OF THE INVENTION

The invention relates to the use of Code Division Multiple Access (CDMA) modulation in a mobile telephone system to permit several conversations to take place simultaneously in the same frequency channel. The fixed network side of the mobile telephone system is divided into cells to provide area coverage. A base station illuminates each cell with CDMA radio signals that carry a number of different conversations overlapping in the same frequency channel. The power in each overlapping signal is graded according to the distance from the mobile it is serving. The strongest of the overlapping signals is reserved and used as a broadcast channel to all mobiles, known as the calling channel, for that cell. The calling channel is used to inform presently silent mobiles if they are being called. In addition, the calling channel also carries information about the status of the cell and immediate neighboring cells. The calling channel's CDMA signal according to the present invention has a fixed phase relationship with the traffic signals that may be used by mobiles in conversation to facilitate decoding of their signals.

BACKGROUND OF THE INVENTION

The cellular telephone industry has made phenomenal strides in commercial operations in the United States as well as the rest of the world. Growth in major metropolitan areas has far exceeded expectations and is outstripping system capacity. If this trend continues, the effect of rapid growth will soon reach even the smaller markets. Innovative solutions are required to meet these increasing capacity needs as well as to maintain high quality service and to avoid rising prices.

Throughout the world, one important step in cellular systems is to change from analog to digital transmission. Equally important is the choice of an effective digital transmission scheme for implementing the next generation of cellular technology. Furthermore, it is widely believed that the first generation of personal communication networks (PCN), (employing low cost, pocket-size, cordless telephones that can be carried comfortably and used to make or receive call in the home, office, street, car, etc.), will be provided by the cellular carriers using the next generation digital cellular system infrastructure and the cellular frequencies.

A key feature demanded in these new system is increased traffic capacity. Currently, cellular mobile telephone systems divide a region to be covered into cells. The modulation system used in current cellular radio systems is called Frequency Division Multiple Access (FDMA), in which each cell is allocated a set of frequencies which are different from the frequencies used in neighboring cells. Each frequency in the FDMA system only carries one conversation, and therefore the reuse of a frequency in another cell is only permitted when it is a sufficient distance away from the first cell so that interference does not occur. In FDMA cellular systems, one frequency per cell is dedicated to be a so-called calling channel. The frequency of the calling channel the frequency a mobile monitors when the mobile station is in an idle condition, and is used by the network to call mobiles when a conversation is originated by the network. A corresponding uplink frequency (mobile to base) is available for use by the mobile to originate calls. The FDMA calling channel also carries information about neighboring cells' calling channel frequencies and also identifies the cell in the network.

In the United States and Europe, time division multiple access (TDMA) is about to be introduced for the provision of cellular mobile telephone services. In the United States' system, the FDMA calling channel is retained as the method by which calls are initiated. In the European GSM system, the TDMA format provides eight time slots on each 200 kHz-wide frequency channel. One of these eight time slots on one of the frequency channels of each cell is designated as a calling channel. The information carried on the TDMA calling channel includes TDMA synchronization information, details about surrounding cells and calls to specific mobiles.

SUMMARY OF THE INVENTION

The present invention relates to the provision of a calling channel in a CDMA system. The CDMA system differs from the TDMA and FDMA systems in that several signals overlap in both the time domain and the frequency domain. According to the present invention, the calling channel is chosen to be the strongest overlapping signal so that it reaches mobiles which are located on the cells' extreme boundaries. The interference other signals experience because they overlap with the calling channel may be avoided by having the mobiles first demodulate the calling channel signal and then subtract it out before demodulating their own signals.

In contrast with the FDMA and TDMA systems, the inventive CDMA system permits mobiles to read the calling channel at the same time as decoding their own communication signals. Moreover, the calling channels for neighboring base stations can directly share the same frequency by means of a different spreading code, so that a mobile can also detect the strength of neighboring base stations and read their calling channels without changing frequency. In FDMA systems, a mobile cannot receive a signal from a neighboring base station at the same time it is receiving traffic signals. In TDMA systems, this can only be done by the mobile changing frequency during idle time slots, which requires a fast switching synthesizer. The inventive CDMA system permits mobiles to detect the calling channels of its own base station and surrounding base stations even during a conversation, without needing to change frequencies.

BRIEF DESCRIPTION OF THE DRAWINGS

The present invention will now be described in more detail with reference to preferred embodiments of the invention, given only by way of example, and illustrated in the accompanying drawings, in which.

DETAILED DESCRIPTION OF THE PREFERRED EMBODIMENTS

While the following description is in the context of a cellular communication systems involving portable or mobile radio telephones and/or personal communication networks, it will be understood by those skilled in the art that the present invention may be applied to other communication applications.

Figure 1:
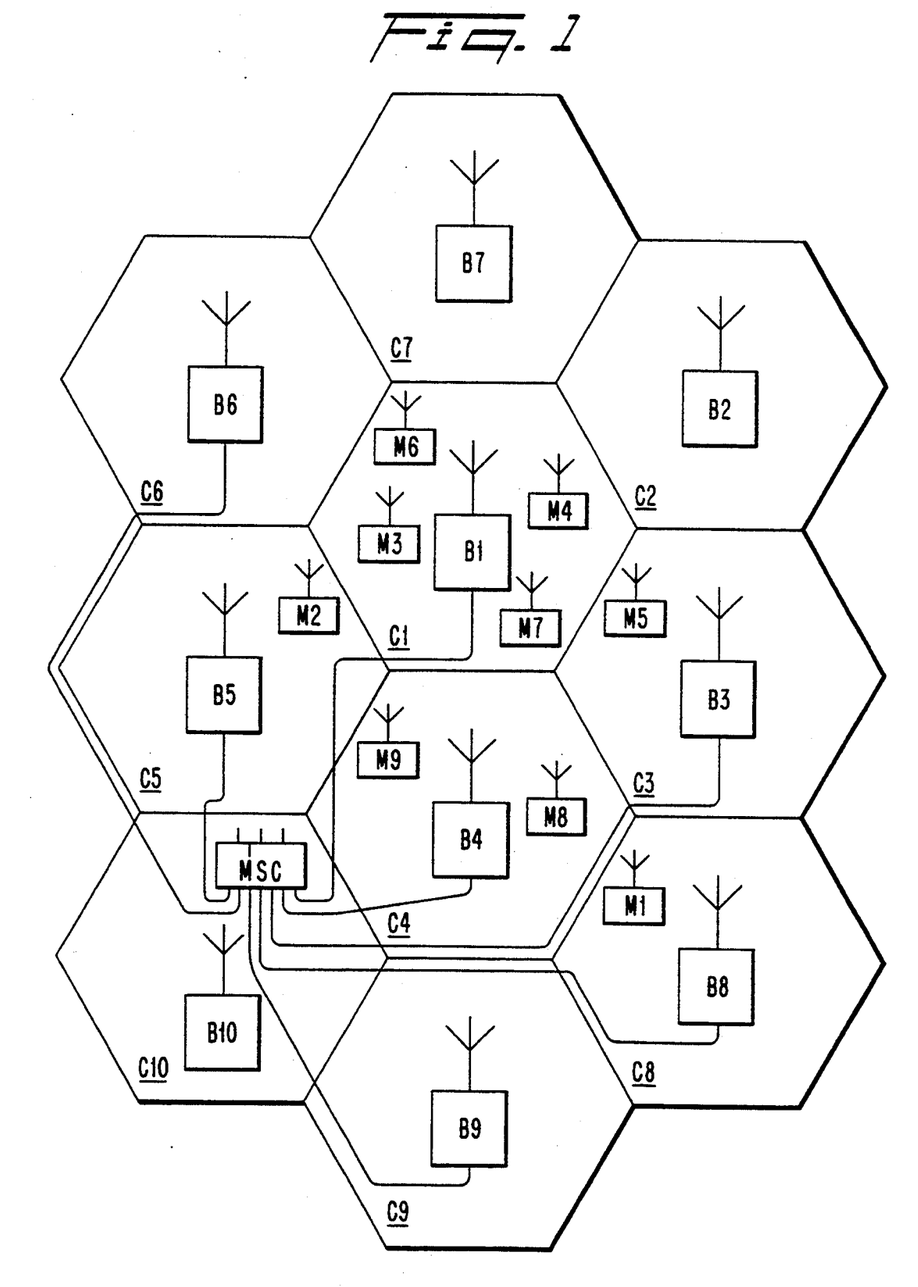
FIG. 1 illustrates a portion of a cellular mobile radio system having cells, a mobile switching center, base stations and mobile stations.

FIG. 1 illustrates ten cells C1–C10, in a cellular mobile radio system. Normally a cellular mobile radio system according to the present invention would be implemented with more than ten cells. However, for the purposes of simplicity, the present invention can be explained using the simplified representation illustrated in FIG. 1. For each cell, C1–C10, there is a base station B1–B10 with the same reference number as the corresponding cell. FIG. 1 illustrates the base stations as situated in the vicinity of the cell's center and having omnidirectional antennas. The cells C1–C10 are, therefore, schematically represented as hexagons. The base stations of adjacent cells may, however, be co-located in the vicinity of cell borders and have directional antennas as is well known to those skilled in the art.

FIG. 1 also illustrates nine mobile stations M1–M9, moveable within a cell and from one cell to another. In a typical cellular radio system, there would normally be more than nine cellular mobile stations. In fact, there are typically many times the number of mobile stations as there are base stations. However, for the purpose of explaining the invention, the reduced number of mobile stations is sufficient.

Also illustrated in FIG. 1 is a mobile switching center MSC. The mobile switching center MSC illustrated in FIG. 1 is connected to all ten base stations B1–B10 by cables. The mobile switching center MSC is also connected by cables to a fixed public switching telephone network or similar fixed network. All cables from the mobile switching center MSC to the base stations B1–B10 and cables to the fixed network are not illustrated.

In addition to the mobile switching center MSC illustrated, there may be another mobile switching center connected by cables to base stations other than those illustrated in FIG. 1. Instead of cables, other means, for example, fixed radio links may be used for connecting base stations B1–B10 to the mobile switching center MSC. The mobile switching center MSC, the base stations B1–B10 and the mobile stations M1–M9 are all computer controlled.

Figure 2:
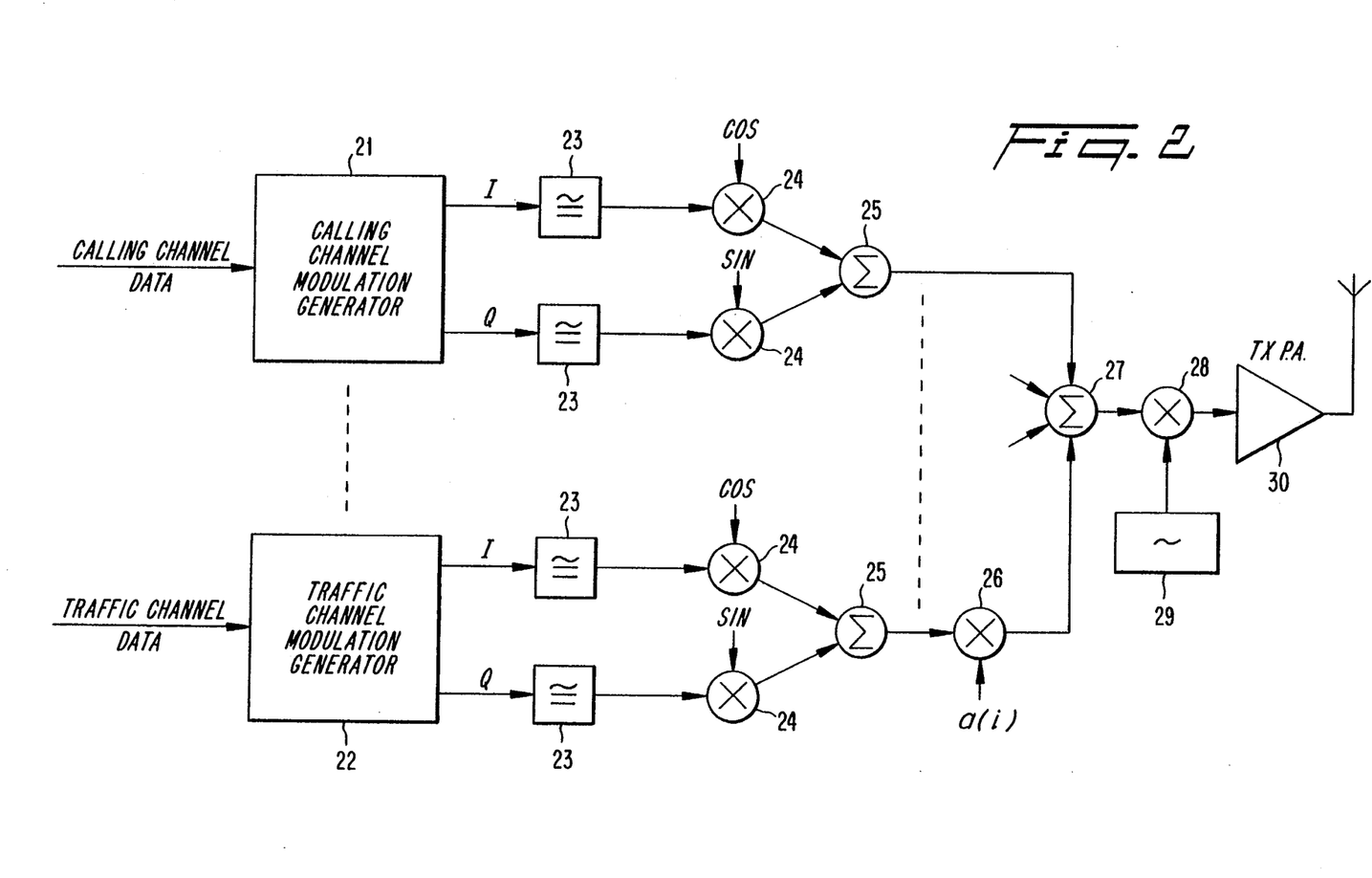
FIG. 2 illustrates the general arrangement of one implementation of a base station transmitting apparatus according to the present invention.

FIG. 2 illustrates the general arrangement of one implementation of a base station which contains transmitting apparatus according to the present invention. A modulation generator 21 accepts digital data which is to be transmitted on a calling channel. The modulation generator 21 uses a combination of error correction and spread spectrum coding to give the signal a higher bit rate stream for transmission. The modulation generator 21 then converts the signal to I, Q waveforms that are applied through low-pass filters 23 to balanced modulators 24 along with sine and cosine carrier signals at an appropriate intermediate frequency. A symbol at the higher, spread spectrum bit rate, is called a chip. Chips can be modulated onto a radio frequency carrier using an appropriate and well known modulation technique. Various modulation techniques are well-known and include quadrature phase shift keying, offset quadrature phase shift keying, quadrature amplitude modulation and offset quadrature amplitude modulation. For example, even chips can be applied to an I channel and odd chips can be applied to a Q channel to create QPSK modulation. If chip timing is offset by one chip period between the I and Q channels, offset QPSK is created.

Each traffic channel has a similar I,Q modulation generator 22 driven by traffic data bits. The modulated sine and cosine waves are added in summing network 25. The signal from the calling channel summing network 25 is applied directly to the input of an overall summing network 27 while each traffic signal is first reduced by a factor of A1, A2, A3 . . . in attenuators or variable gain devices 26 before being applied to the overall summing network 27. The sum of the calling channel and the weighted traffic signal from summing network 27 are then up-converted in mixer 28 using a suitable local oscillator frequency from a frequency synthesizer 29 and amplified up to a desired transmit power level in a linear amplifier 30.

Figure 3:
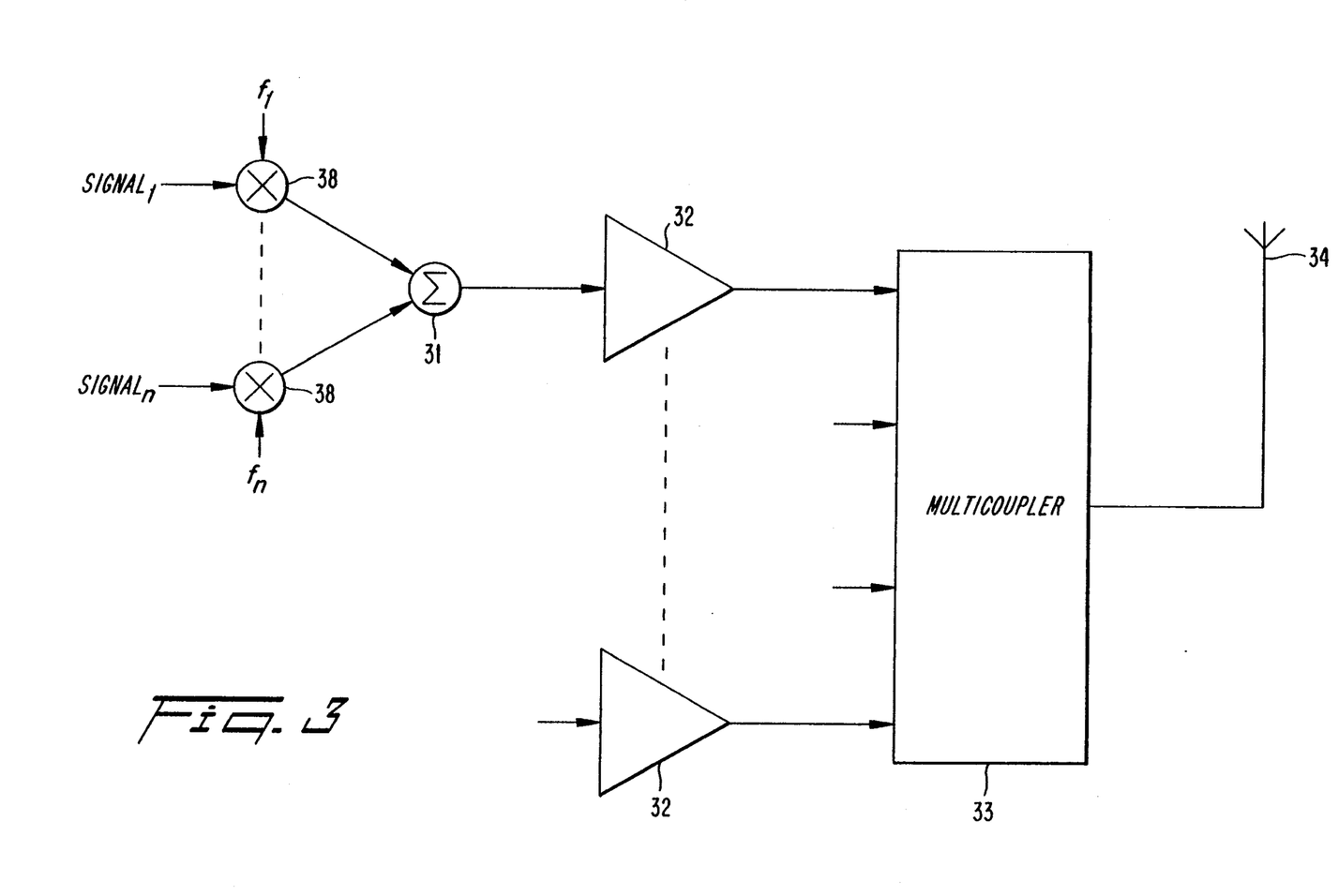
FIG. 3 illustrates the combination of several signals at a base station.

Each frequency used in the cell has a similar arrangement. It is possible that the composite signals from two or more mixers 38 that are up-converted to different frequencies can be summed in a further summing network 31 and applied to a common transmit power amplifier 32 as illustrated in FIG. 3. The outputs from several power amplifiers 32 which have sufficiently separated frequencies can be further combined in a multicoupler unit 33 and sent to a common antenna 34. As a result, the addition of still further cell capacity would need a number of separate antennas.

Figure 4:
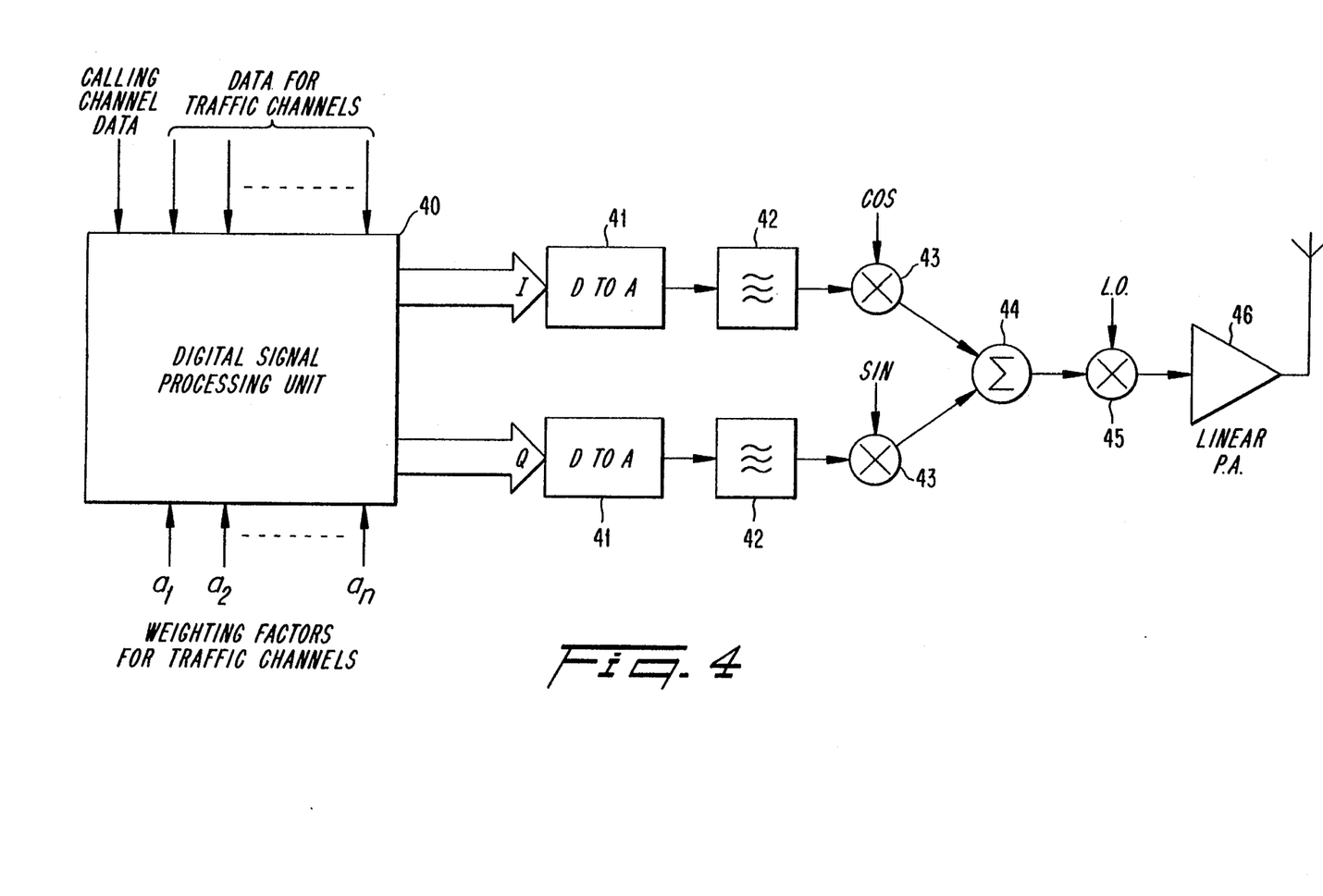
FIG. 4 illustrates a block diagram of digital signal generation.

FIG. 4 illustrates an alternative implementation of the present invention that performs weighting of the signals digitally before D to A conversion and application to a common I,Q modulator. A digital signal processing unit 40 accepts a number of traffic data streams in addition to a calling channel data stream and numerically generates waveform samples corresponding to the desired I,Q modulation. Each traffic signal I,Q waveform sample is then weighted by multiplying the sample with a desired factor for that signal before being added to the calling channel I,Q samples. The sum is then outputted from the digital signal processing unit to an "I" D to A convertor 41 and a "Q" D to A converter 41. The output signals from the D to A converters 41 are low-pass filtered in filter 42 to interpolate the signal between the samples, reconstructing continuous waveforms to drive the sine/cosine modulator 43. The outputs from the sine/cosine modulators 43 are then summed in summing network 44 and then up-converted in mixer 45 to the selected transmission frequency. A linear transmitter power amplifier 46 raises the power level to the desired level for transmission.

In the present invention, the levels of each traffic signal in the composite sum-signal are independently controlled by adjusting the weighting factors A1, A2, A3 . . . which are set according to the distance between the mobile station and the base station. More specifically, a preferred implementation of the present invention employs a duplex power control system in which the base station increases the power transmitted to a mobile if the signal received by the base station is too weak, and reduces the weighting factor in order to reduce the power transmitted to the mobile if the signal from the mobile station is too strong. A duplex power control system is disclosed in "Duplex Power Control", U.S. patent application Ser. No. 07/866,554, filed Apr. 10, 1992, and is incorporated herein by reference.

Figure 5:
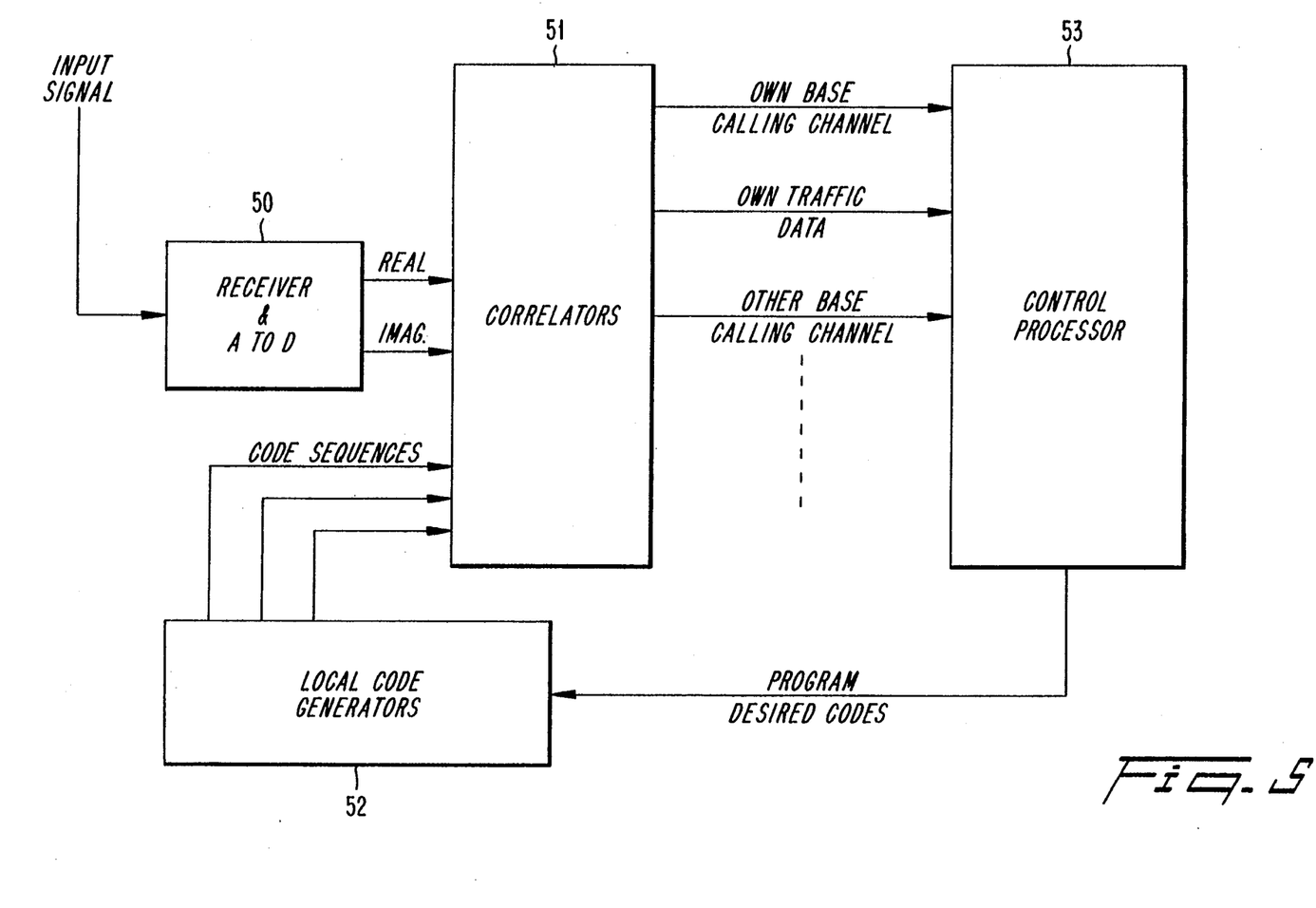
FIG. 5 illustrates a block diagram of the general arrangement of a receiver in a mobile station according to the present invention.

The mobile receiver block diagram for use in the present invention is illustrated in FIG. 5. A receiver 50 amplifies, filters and down-converts a received signal received on a selected frequency channel before A to D converting its complex vector components. The digitized complex vector components are applied to a bank of correlators 51 along with signals produced by a local code generator 52 corresponding to the traffic channel code and calling channel codes of its own and surrounding base stations. The correlators 51 extract the underlying information modulated on each CDMA signal and transfer the information from detected calling channels to a control processor 53. The control processor 53 can include means such as an error correction decoder to reduce the incidence of bit errors caused by noise. Traffic data extracted by the correlator 51 for the traffic channel can be used in for example, a digital speech decoder.

The data from detected calling channels, along with signal strength information about each signal is used by the control processor 53 to ascertain the codes of other surrounding base stations, and to program the code generator to search for new base stations when appropriate. The control processor can also determine whether the base station currently in use is the best base station or whether a stronger base station is available. In this case, a handover to the strongest base station as indicated by the relative signal strength of its calling channel signal can be requested. In addition, the mobile station can report the measured signal strengths to its base stations, whereafter the communication system can determine which base station to use to transmit traffic to the mobile station.

In another embodiment of the present invention, the calling channels of all base stations use the same CDMA codes and are synchronous. Because of different distances between different base stations and a selected mobile station, the signals might not be synchronous at the mobile but rather delayed by one or more chips. In this case, the composite signal appears to the mobile as being a single signal with a delayed echo. A RAKE receiver may then be employed to decode the composite signal. A suitable RAKE receiver is described in U.S. Pat. No. 5,237,586, filed on Mar. 25, 1992, for "Rake Receiver with Selective Ray Combining", which is expressly incorporated here by reference.

In the preferred embodiment of the present invention, the calling channel signal from a base station has a fixed phase relationship with the traffic signal for a mobile station. The phase of the traffic channel signals relative to the calling channel is thus deliberately fixed at either 0, 90, 180 or 270 degrees. The preferred relative phase between traffic and calling channels, wherein the traffic signals are put in an ordered list according to their signal strength, alternates between 0° and 90°. For example, the strongest signal is the calling channel and it is treated as the phase reference and is considered to have a phase of 0°. The traffic channel which is the next strongest channel is then set to 90°. Using QPSK modulation, this is accomplished by interchanging the I and Q signals produced by the modulation generator. The traffic channel which has the third strongest signal is then set to 0° again and so on. The purpose of this preferred arrangement is to reduce mutual interference between signals.

The fixed phase relationship may be exploited by the mobile to improve decoding of the mobile's traffic signal. Since the calling channel has the strongest signal strength, it is decoded first by the mobile and its phase can be determined. The phase may then be used as a coherent reference for demodulating the traffic signal. More particularly, a RAKE receiver can decode signals that suffer from delayed echoes by correlating various time shifts of the received signal with the code of the signal. Each correlation produces a complex number corresponding to the phase and amplitude of the echo of that delay. Information on the phase and amplitude of each echo found during demodulation of the calling channel may then be applied to effect coherent combination of the energy in different echoes for traffic signal demodulation.

According to another aspect of the present invention, the format of data, which is broadcast by the calling channel, has a specific format to enable idle mobiles to predict when messages addressed to them are likely to be broadcast. As a result, a mobile can enter a power saving mode at other times when reception is not needed.

The calling channel transmission has a multiplexed data format which is divided into data blocks of roughly 20 millisecond durations. The duration of data blocks is deliberately made to equal the duration of the analysis period of the digital speech encoder used for sending speech on the traffic channels. The 20 ms data blocks are further sub-multiplexed between common data broadcasts for all mobile stations and data addressed to limited subgroups of mobiles. The subgroup to which a mobile station belongs is determined by the mobile stations mobile identification code. For example, 10 subgroups could be defined by using the last decimal digital of the telephone number of the mobile station as the mobile identification code. The calling channel format would then consist of 20 ms of common data transmission, followed by 20 ms of data transmission to a mobile phone with a number ending in zero, followed by a 20 ms transmission to a phone ending in 1, and so on. As a result, the whole format repeats every 220 ms. When the network initiates a call to a mobile station, it places the message in the corresponding block. As a result, a mobile station knows that it only needs to listen for calls in its assigned 20 ms time slot out of the 220 ms cycle, and thus may enter a power saving mode for approximately 90% of the time.

In addition, the present invention, by virtue of setting the duration of the calling channel data block equal to the duration of the speech coder analysis period, has the further advantage that speech data frame synchronization is already available in the mobile station at call setup by simply monitoring the calling channel.

Figure 6:
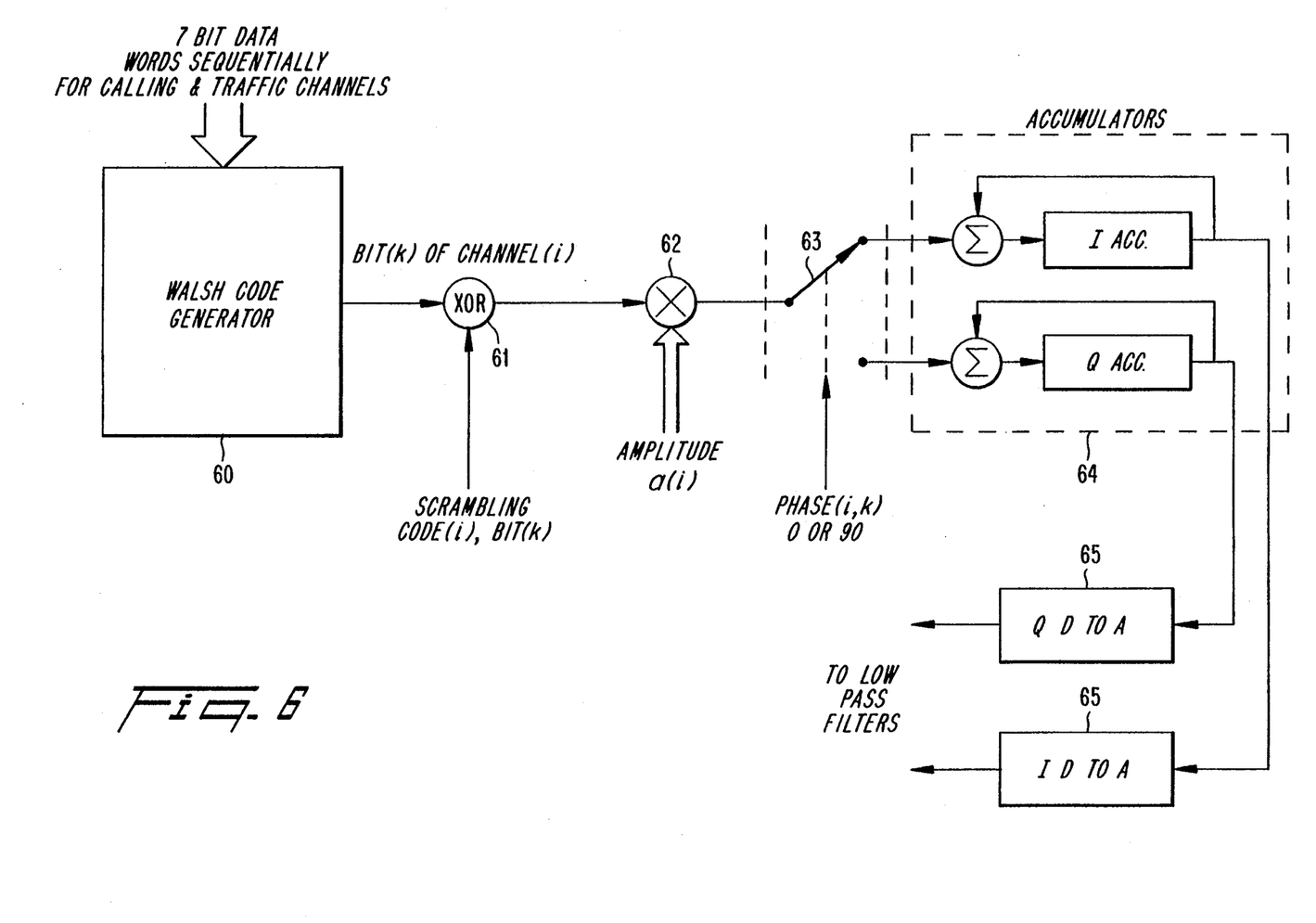
FIG. 6 illustrates a block diagram of a preferred embodiment of a base station.

Another embodiment of the present invention is illustrated in FIG. 6. Data bits for each traffic signal or the calling channel are grouped into groups of seven and applied to a 128 bit orthogonal Walsh code generator 60. The Walsh code generator 60 produces a sequence of 128 output bits that are bit-wise exclusive-ORed in XOR gate 61 with a scrambling bit sequence unique to each signal. The scrambled Walsh code sequence then determines by means of sign-changer 62 whether the constant a(i), being the desired amplitude of signal i, is added or subtracted from one of the accumulators 64. A switch 63 determines which accumulator the constant a(i) is added or subtracted from. In principle, for an even "i", the switch 63 is operated so that even-numbered scrambled Walsh code bits cause the constant a(i) to be routed to the I accumulator while odd-numbered bits cause the constant a(i) to be routed to the Q accumulator. On the other hand, the reverse applies for an odd "I". However, there is a need to modify this regular alternating order on occasions, as will be further described below, so that in practice the switch 63 is steered by a controlled bit stream which indicates whether the signal has a zero or 90° relative phase.

The processor accumulates the values over all signals one Walsh code word bit at a time and then the "I" and "Q" accumulator contents are outputted to a pair of digital to analog converters 65. The accumulators 64 are then cleared of the values accumulated for all signals and the next Walsh code word bits are accumulated, and so on. As a result, the D to A converters 65 receive a new value for each Walsh ,code bit, and a particular signal affects the I and Q values on alternate bits. The output signals from the "I" and "Q" D to A converters 65 are low-pass filtered and applied to sine/cosine modulators.

The preferred modulation used in this embodiment is not conventional OQPSK modulation, but rather a variation thereof called impulse excited OQPSK or impulse excited offsite quadrature amplitude modulation (OQAM). The difference between the two forms of modulation is that a bit polarity is not represented by a constant plus or minus value, but rather by a positive or negative impulse which is used to shock excite the I or Q low-pass filter. The time during which the waveform generated for a bit effects the transmitted signal is limited to the duration of the impulse response of the low-pass filters. If the duration is several symbols long, say five bits, the waveform at any instant is due to the superimposition of five delayed impulse responses which have the polarities of the symbols in question. As a result, there are only two to the power of 5 possible waveforms over a bit interval, which corresponds to all possible polarity combinations the five symbols can take on. A preferred implementation of the present invention is to predetermine points on these waveforms for each combination and to store them in a memory. For every I or Q symbol period, one of these stored waveforms is then selected from the memory according to the five previous symbol polarities and the waveform is outputted point-by-point to the A to D converters. Typically, eight points over each symbol period might be used to generate a smooth waveform that does not need a lot of low-pass filtering after the D to A conversion.

The base station signal generator described above produces the sum of a calling channel code word with a weight of 1 with several traffic channel code words of progressively lower amplitude weighting and a nominally alternating phase relative to the calling channel which alternates between 0° and 90°. Because the relative amplitudes given by the constant a(i) are slowly being modified by the base station master controller to adapt to varying mobile station distances, the ordered list of signal-strengths can suddenly change as two signal levels cross over. This could mean that the zero or 90 degree phase of a signal could suddenly and unexpectedly change. To prevent such an occurrence, the occasions on which the phase of a traffic signal is permitted change are limited to once per block of 42 Walsh code words per signal. At the beginning of such a block, which corresponds to a 20 ms speech coder analysis frame, the desired phasing of the signal for the whole block is determined from its position. The appropriate bit is then set in the control bit stream by switch 63 to select the phase for that signal. The same phase is used for a complete block of 42 transmitted code words. The first two code words transmitted in a block of 42 Walsh code words do not carry traffic data but rather they carry control data from the mobile station. The code word transmitted on these two occasions is limited to indicating whether the base station will transmit the remaining 40 code words or not. The mobile is able to detect these special code words regardless of phase, and the mobile station can determine the phase expected for the remaining 40 code words in the block.

Figure 7:
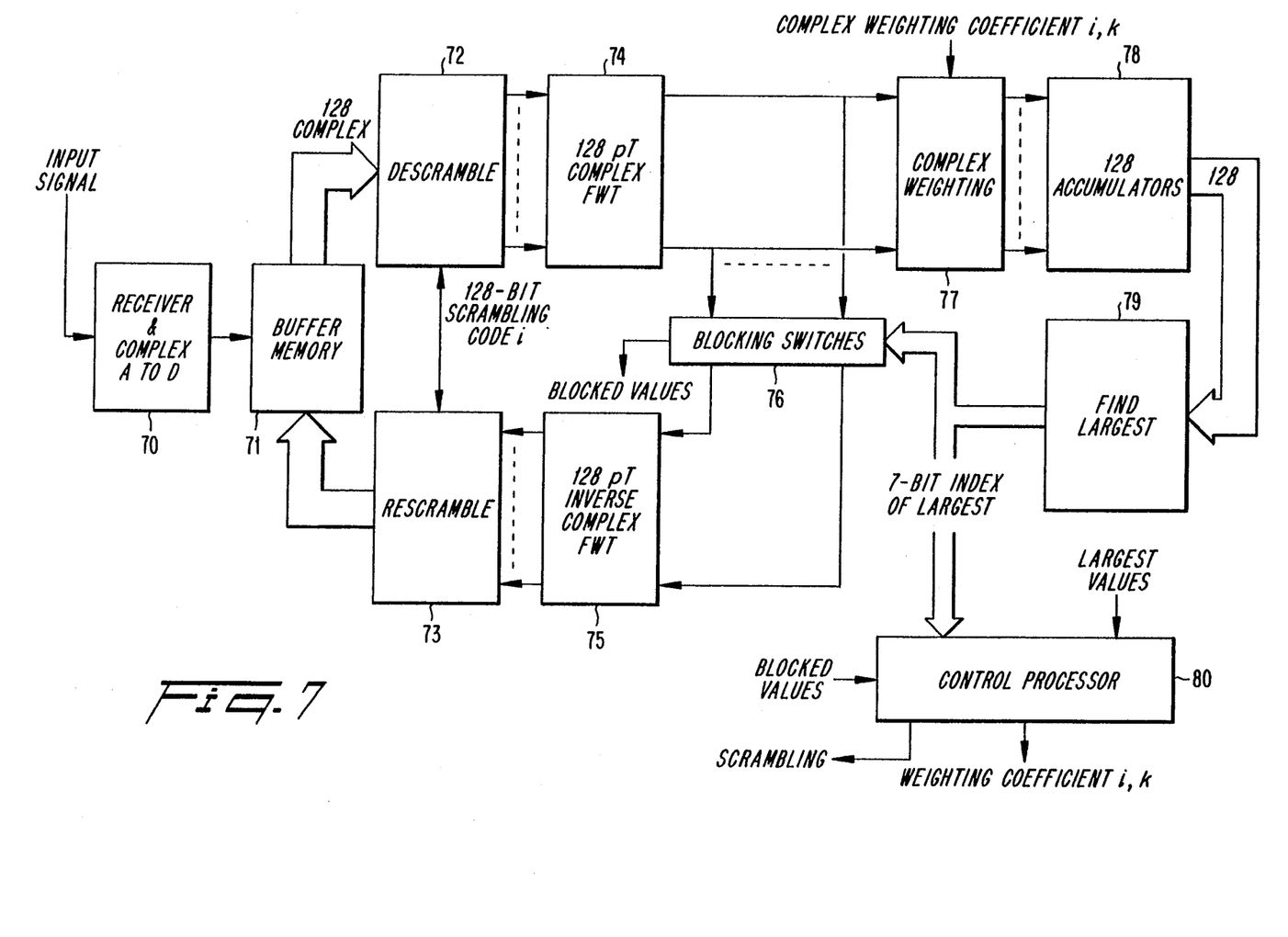
FIG. 7 illustrates a block diagram of a preferred embodiment of a receiver in a mobile station.

A preferred mobile station receiver for receiving signals produced by the above described base station signal generator is illustrated in FIG. 7. The receiver receives an input signal from an antenna, suitably filters, amplifies and down-converts it before sampling the signal and digitalizing the signals complex vector components with the aid of an A to D converter. The digitized complex samples are collected in a buffer memory 71 until the next block of 128 new samples is ready for processing. The control processor 80 provides 128 bit scrambling words for each signal that is to be demodulated in turn. The scrambling word is used to descramble the contents of the buffer memory by changing the signals of the real and imaginary parts by one or zero using a descrambler 72. A set of 128 complex samples, descrambled with the scrambling mask of a desired signal to be demodulated is passed to the fast Walsh transform computer 74. The selection and use scrambling masks is described in co-pending, commonly assigned U.S. patent application Ser. No. 07/866,865, filed on Apr. 10, 1992, for "Multiple Access Coding for Mobile Radio Communications", which is expressly incorporated here by reference.

The fast Walsh transform computer 74 calculates correlations with all possible 128 orthogonal Walsh-Hadamard code words. A suitable fast Walsh transform computer is described in U.S. patent application Ser. No. 07/735,805, filed on Jul. 25, 1991, which expressly incorporated here by reference. The fast Walsh transform computer 74 separately processes the real and imaginary parts and the complex correlations are sent to the weighting multipliers 77. All 128 complex values are multiplied by the same complex weight which is supplied from the control processor 80. The complex weight, however, is varied according to the sample shift of the buffer contents which are currently being processed.

Each signal, which is being descrambled, can be processed using one or more shifts of the samples in the buffer 71 and the weighted fast Walsh transform results are accumulated for all such shifts in accumulators 78. In order to process 128 signal samples using more than one time shift of the signal, the buffer 71 needs to keep some old samples from the previous block. For example, to process a time shift, one sampled shift requires 127 new samples and one old sample; to produce a time shift two samples shifted requires 126 new samples and two old samples, and so on.

After accumulating all shifts, the accumulator contents are processed in comparator 79 to determine the largest value. This can either be the largest magnitude or the largest algebraic value depending on the initial setup of comparator 79. The 7 bit index of the largest value is then routed to the central processor 80 and to the blocking switches 76. The index selects one of the 128 complex signals to be replaced by zero at the input to the inverse fast Walsh transform computer 75. The complex value which is blocked from reaching the inverse fast Walsh transform computer 75 is routed instead to the control processor 80. The inverse fast Walsh transform reconstructs a new set of signal samples wherein the detected code word is removed. After rescrambling in scrambler 73 using the same mask used in the descrambling process, the new samples are placed back in the same buffer locations. This process is carried out for all sample buffer shifts used in the accumulation process, in an order determined by the control processor. This corresponds to the forecast strength of the correlation on each shift in the order from strongest to weakest. The block values for each shift that are returned to the control processor are used by the control processor to predict the order for the next 128 sample block. These values are also used by the control processor to predict the optimums weighting coefficients to be used for the next block.

For the two special code words that can only take on one of two values, the weighting unit is signalled by the control processor 80 to operate in a slightly different manner. It can be controlled to perform accumulations corresponding to the two code words in question using either normal weights, or the weights rotated through 90° or weights that are derived from the complex conjugates of the impulse signals themselves which results in phase-independent non-coherent detection. Depending on whether the normal weights or the 90° rotated weights give the largest result, the control processor 80 decides to use the same weights for the remaining 40 code words in a traffic frame.

The above process is carried out for each signal transmitted by the base station in turn, starting with the strongest signal, the calling channel, and continuing in a descending order of predicted signal strength at least until the traffic signal of the mobile is decoded. According to one aspect of the present invention, the weighting coefficients provided by control processor 80 for traffic signal processing are derived by processing previous correlation values computed during processing of received information. Specifically, the weights of the coherent RAKE taps used for traffic decoding are obtained from the decoding of the calling channel by virtue of their deliberately arranged, and known phase relationship.

Decoding may continue for signals of lower strength in order to predict which signals are about to become larger than the desired signal. Decoding may also include signals transmitted by other neighboring base stations that, perhaps due to relative fading, are for the moment larger than the desired signal. It will be understood that the specific values of the 128 bit Walsh codes and 42 code words per traffic frame of the preferred embodiment are not meant to be limiting factors, but that any person of appropriate skill in the art can dimension systems for particular communication needs using other parameters while still being completely within the scope and intent of the present invention.

While a particular embodiment of the present invention has been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method for transmitting control information and user traffic signals from a first base station to a plurality of mobile stations in a code division multiple access communication system comprising the steps of:

coding control information using a spread spectrum code unique to control information to form a calling channel signal;

coding each user traffic signal using a spread spectrum code unique to each traffic signal;

adding said calling channel signal and said coded traffic signal using predetermined weighting factors to obtain a composite signal;

modulating said composite signal on a radio frequency carder to form a radio frequency signal;

transmitting said radio frequency signal to said plurality of said mobile stations;

receiving said radio frequency signal at at least one of said mobile stations:

decoding said received signal in said mobile station to extract said control information wherein said control information is used by said mobile station to determine if said mobile station is being called and to determine a phase of the calling channel signal; and decoding said radio frequency signal in said mobile station using said phase of the calling channel signal to extract traffic information intended for said mobile station.

2. A method for transmitting control information and user traffic signals according to claim 1, wherein said spread spectrum coding is orthogonal block encoding using scrambled Walsh-Hadamard codewords.

3. A method for transmitting control information and user traffic signals according to claim 1, wherein said calling channel signal is the largest signal in said composite signal.

4. A method for transmitting control information and user traffic signals according to claim 1, wherein specific relative phase of each of the signals within said composite signal alternate 90° when ordered according to signal strength.

5. A method for transmitting control information and user traffic signals according to claim 1, wherein said modulation is by quadrature phase shift keying.

6. A method for transmitting control information and user traffic signals according to claim 1, in which said modulation is by offset quadrature phase shift keying.

7. A method for transmitting control information and user traffic signals according to claim 1, in which said modulation is by quadrature amplitude modulation.

8. A method for transmitting control information and user traffic signals according to claim 1, in which said modulation is by offset quadrature amplitude modulation.

9. A method for transmitting control information and user traffic signals according to claim 1, wherein said decoding of said radio frequency signal in said mobile station is carded out using a fast Walsh transform computer.

10. A method for transmitting control information and user traffic signals according to claim 1, wherein said decoded control signal is extracted from the radio frequency signal prior to decoding traffic information.

11. A method for transmitting control information and user traffic signals according to claim 1, wherein said control information includes information about surrounding base stations.

12. A method for transmitting control information and user traffic signals according to claim 1, wherein said control information carries information for a specific group of mobile stations only at predetermined times.

13. A method for transmitting control information and user traffic signals according to claim 12, wherein said predetermined times depend upon a mobile identification number for each of said mobile stations.

14. A method for transmitting control information and user traffic signals according to claim 12, wherein said mobile stations reduces processing to conserve power at times other that said predetermined times.

15. A method for transmitting control information and user traffic signals according to claim 1, wherein said decoding of said radio frequency signal in said mobile station is performed by a non-coherent RAKE receiver.

16. A method for transmitting control information and user traffic signals according to claim 1, wherein said decoding of said radio frequency signals in said mobile station is performed by a coherent RAKE receiver.

17. A method for transmitting control information and user traffic signals according to claim 16, wherein coefficients for RAKE tap weighting used during traffic signal decoding are derived from correlations calculated during calling channel decoding.

18. A method for transmitting control information and user traffic signals according to claim 1, wherein said mobile stations receive more than one base station signal on the same frequency.

19. A method for transmitting control information and user traffic signals according to claim 18, wherein said mobile stations process calling channel signals for more than one base station.

20. A method for transmitting control information and user traffic signals according to claim 18, wherein said mobile stations process traffic signals for more than one base station.

21. A method for transmitting control information and user traffic signals according to claim 19, wherein said mobile stations use relative calling channel signal strengths determined by decoding different base station signals to ascertain the best base station to communication with.

22. A method for transmitting control information and user traffic signals according to claim 18, wherein each of said mobile stations reports signal strengths determined by decoding different base station signals to a base station transmitting traffic for that mobile station.

23. A method for transmitting control information and user traffic signals according to claim 22, wherein a base station is selected to transmit traffic to said mobile station based upon said reports of signal strength.

24. An apparatus for transmitting control information and user traffic signals from a first base station to a plurality of mobile stations in a code division multiple access communication system, comprising:

first coding means for coding control information using a spread spectrum code unique to control information to form a calling channel signal;

a second coding means for coding each user traffic signal using a spread spectrum code unique to each traffic signal;

summation means for adding said calling channel signal and said coded traffic signal using predetermined weighting factors to obtain a composite signal;

modulation means for modulating said composite signal on a radio frequency carrier to form a radio frequency signal;

transmitting means for transmitting said radio frequency signal to said plurality of said mobile stations;

receiving means for receiving said radio frequency signal at at least one of said mobile stations;

decoding means for decoding said received signal at said mobile station to extract said control information, wherein said control information is used by said mobile station to determine if said mobile station is being called and to determine a phase of the calling channel signal; and second decoding means for decoding said radio frequency signal in said mobile station using said phase of the calling channel signal to extract traffic information intended for said mobile station.

25. An apparatus according to claim 24, wherein said second decoding means includes extraction of a control signal from said radio frequency signal prior to decoding of traffic information.

26. An apparatus according to claim 24, wherein said second decoding means uses a non-coherent RAKE receiver.

27. An apparatus according to claim 24, wherein said second decoding means uses a coherent RAKE receiver.

28. An apparatus according to claim 27, wherein coefficients for RAKE tap weighting used during traffic signal decoding are derived from correlations calculated during calling channel decoding.

* * * * *